United States Patent [19]

Tsumura

[11] 4,183,745
[45] Jan. 15, 1980

[54] DEMAGGING PROCESS FOR ALUMINUM ALLOY WITHOUT AIR POLLUTION

[76] Inventor: Yoshishige Tsumura, 39-7 Minami-Magome 1 chome, Ohta-ku, Tokyo, Japan

[21] Appl. No.: 872,224

[22] Filed: Jan. 25, 1978

Related U.S. Application Data

[63] Continuation of Ser. No. 757,650, Jan. 7, 1977, abandoned.

[30] Foreign Application Priority Data

Feb. 16, 1976 [JP] Japan .................................. 51-14822

[51] Int. Cl.² ............................................ C22B 21/06
[52] U.S. Cl. .................................. 75/68 R; 75/67 A;
204/61; 204/67; 204/70
[58] Field of Search ....................... 204/61, 67, 70, 140, 204/146; 75/67 R, 67 A, 68 R, 61, 70

[56] References Cited

U.S. PATENT DOCUMENTS

| 673,364 | 4/1901 | Hoopes | 204/67 |
| 1,258,261 | 3/1918 | Seward | 204/70 |
| 3,335,076 | 8/1967 | Burkhardt | 204/140 |

Primary Examiner—M. J. Andrews
Attorney, Agent, or Firm—Kurt Kelman

[57] ABSTRACT

Removal of magnesium from a magnesium-containing aluminum alloy is obtained by melting the aluminum alloy, superposing a layer of molten flux containing chlorides or fluorides upon the molten aluminum alloy, and passing an electric current between the molten aluminum and the molten flux for thereby causing magnesium to pass from the aluminum layer into the flux layer and form magnesium chloride or magnesium fluoride.

2 Claims, 3 Drawing Figures

DEMAGGING PROCESS FOR ALUMINUM ALLOY WITHOUT AIR POLLUTION

This is a continuation of application Ser. No. 757,650, filed Jan. 7, 1977 now abandoned.

BACKGROUND OF THE INVENTION

This invention relates to a process for removing unwanted magnesium from an aluminum alloy without causing pollution of the air.

Magnesium, if contained in wrought products of aluminum alloy (containing pure aluminum), improves the mechanical properties of the material without impairing the corrosion-resistance thereof. In this respect, it is a useful alloying element. Aluminum alloys prepared so as to contain up to about 5% of magnesium find widespread acceptance as corrosion-resistant aluminum alloys.

In the case of aluminum alloys for use in castings, particularly in die castings, however, magnesium is an unwanted element. Inclusion of magnesium in these aluminum alloys, therefore, is rigidly controlled. For use in castings, aluminum alloys are prepared so as to contain a fairly large proportion of silicon with a view to improving their casting property. Magnesium, if present therein, reacts with silicon to produce an intermetallic compound $Mg_2Si$ which embrittles the alloys. This explains why the presence of magnesium in such aluminum alloys is undesirable.

According to JIS (Japanese Industrial Standard) H-5302 titled "Die Casting Aluminum Alloys," the allowable magnesium content in ADC10 and ADC12 which together account for more than 95 percent of the die casting alloys actually used in Japan is specified as not to exceed 0.3 percent as shown in the table. Most standards adopted by ordinary consumers and those adopted by producers dictate still lower magnesium contents in aluminum alloys. In the case of 380-series alloys which are used in the largest quantities in the United States, the highest allowable magnesium content is 0.1 percent.

About 85 percent of all the die casting alloys are produced by using aluminum scraps as the raw material. In wrought products of aluminum alloys produced today, the average magnesium content is 0.96 percent. It follows as a consequence that the content of magnesium in alluminum scraps generally exceeds the allowable upper limit of magnesium content in die casting alloys. For use in the preparation of die casting alloys, therefore, such aluminum scraps must be given a treatment for removal of magnesium. The processes heretofore employed for the removal of magnesium are such that they have inevitably caused air pollution.

The removal of magnesium from aluminum alloys has heretofore been accomplished exclusively by either of two methods: (1) one method using chlorine gas and (2) another using a fluoride. The former method comprises blowing chlorine gas into a given molten aluminum alloy. Magnesium exhibits a stronger chemical affinity for chlorine than for aluminum. By making use of this difference of affinity, magnesium is removed in the form of $MgCl_2$ from the aluminum alloy. The waste gas emanating from this treatment, consequently, contains unaltered free chlorine and aluminum chloride in large proportions and causes air pollution. When chlorine gas is blown into the molten aluminum alloy through a graphite pipe as is usually practiced, the chlorine concentration in the waste gas reaches the level of about 3000 ppm. To lower the chlorine concentration in the waste gas, there have been studied various measures, including those of Bell System Process, Alcoa Process, Derham Process, etc.

The Bell System makes use of a bell which is provided with an inlet pipe for chlorine gas and a discharge pipe for waste gas. The Bell System Process effects the removal of magnesium by placing molten aluminum inside the bell in a tightly sealed state and then introducing chlorine gas into the molten metal. This process has been adopted more widely than any other process in the United States.

The Alcoa Process involves an operation which comprises introducing molten aluminum into a closed reaction chamber divided into several sections and passing chlorine gas through the molten metal in the form of finely divided bubbles with the aid of a contactor kept in rotation. ((1) "Alcoa Fumeless Demagging Unit," Report No. 1, Alcoa Technology Marketing Division, Pittsburgh, Pa. 15129, June 1972; (2) Hatch J. E. "Chlorine Control by In-Line Fluxing Operations," Paper No. 73-325, presented at Air Pollution Control Association Seminar, Chicago, June 1973.)

The Derham Process comprises the steps of covering the surface of molten aluminum with a layer of molten flux about 20 mm in thickness and blowing chlorine gas into the molten aluminum for thereby removing magnesium from the molten metal. ((1) Derham L. J. and Derham M. G., "Purification of Aluminum" U.S. Pat. No. 3650730; (2) Andrews C. C., "The Derham Pro- Table

| Type | Symbol | Chemical analysis (%) | | | | | | | | | Foreign counerparts |
|---|---|---|---|---|---|---|---|---|---|---|---|
| | | Cu | Si | Mg | Zn | Fe | Mn | Ni | Sn | Al | |
| Die casting aluminum alloy, Type 10 | ADC10 | 2.0 ~ 4.0 | 7.5~9.5 | 0.3 max | 1.0 max | 1.3 max | 0.5 max | 0.5 max | 0.3 max | Balance | ASTM SC84A DIN GDA1Si6 Cu3 BNF A-S10U4-Y4 Federal A380 |
| Die casting aluminum alloy, Type 12 | ADC12 | 1.5 ~ 3.5 | 10.5~12.0 (9.6~12.0) | 0.3 max | 1.0 max | 1.3 max | 0.5 max | 0.5 max | 0.3 max | Balance | ASTM SC114A DIN - BNF A-S10U4-Y4 Federal SC114A |

| AA code No. | Former Code No. | Product | Si | Fe | Cu | Mn | Mg | Cr | Ni | Zn | Sn | Ti | Others | Balance of aluminum |
|---|---|---|---|---|---|---|---|---|---|---|---|---|---|---|
| 380.0n | 380 | n | 7.5–9.5 | 2.0 | 3.0–4.0 | 0.50 | 0.10 | — | 0.50 | 3.0 | 0.35 | — | 0.50 | Balance |
| 380.2 | 380 | Ingot | 7.5–9.5 | 0.7–1.1 | 3.0–4.0 | 0.10 | 0.10 | — | 0.10 | 0.10 | 0.10 | — | 0.20 | " |
| A380.0n | A380 | D | 7.5–9.5 | 1.3 | 3.0–4.0 | 0.50 | 0.10 | — | 0.50 | 3.0 | 0.35 | — | 0.50 | " |
| A380.1n | A380 | Ingot | 7.5–9.5 | 1.0 | 3.0–4.0 | 0.50 | 0.10 | — | 0.50 | 2.9 | 0.35 | — | 0.50 | " | cess" a bulletin, Aluminum Process Inc., Cleveland, Ohio, 44114, March 1973.)

With the demagging method which makes use of chlorine gas, however, the waste gas is certained to contain harmful free chlorine and aluminum chloride.

In the method which resorts to use of a fluoride, aluminum fluoride is mainly used as the fluoride and the reaction shown below is utilized for the removal of magnesium.

$$2AlF_3 + 3Mg = 3MgF_2 + 2Al$$

This compound, aluminum fluoride, is so expensive as to render this method uneconomical. Moreover, aluminum fluoride undergoes decomposition to give rise to a fluorine compound which causes air pollution. For this reason, this method is not used so widely as the aforementioned method which effects the treatment by use of chlorine.

The primary object of this invention is to provide a process for the removal of magnesium from an aluminum alloy containing magnesium without any possibility of air pollution.

Another object of this invention is to provide a process for the removal of magnesium from a magnesium-containing aluminum alloy, which process can be carried out more readily with a simpler device than the conventional method.

SUMMARY OF THE INVENTION

To accomplish the objects described above according to the present invention, there is provided a process for the removal of magnesium from a magnesium-containing aluminum alloy, which process comprises melting said aluminum alloy, superposing a layer of flux containing either or both chlorides and fluorides upon the molten aluminum alloy, disposing electrodes one each in the aluminum alloy layer and the flux layer, passing an electric current between the electrodes for thereby causing generation of either or both chlorine and fluorine from the molten flux layer, whereby the magnesium present in the aluminum alloy is reacted upon by chlorine and/or fluorine to give rise to either or both magnesium chloride and magnesium fluoride and the produced magnesium chloride and/or magnesium fluoride immediately passes into the flux layer, thus effecting the removal of magnesium from the aluminum alloy.

DETAILED DESCRIPTION OF THE INVENTION

The present invention relates to a process for the removal of magnesium from a magnesium-containing aluminum alloy by an operating principle entirely different from the conventional methods involving use of chlorine and aluminum fluoride with absolutely no possibility of entailing air pollution. The essence of this invention resides in covering a molten aluminum alloy with a layer of molten flux containing either or both chlorides and fluorides and passing an electric current between the molten alloy and the flux layer. By the ensuing electrolysis, the molten flux layer emits free chlorine or fluorine or a mixture of the two gases, depending on the composition of said layer. The free chlorine, fluorine or mixture thereof reacts with the magnesium and the reaction product floats up and lodges itself in the flux layer. This explains why this process has no possibility of any harmful reaction product being released into the atmosphere.

Now, the process of this invention will be described in full detail with reference to FIG. 1. Into a suitable container 1 adapted to be heated or insulated, molten aluminum alloy A subjected to treatment is poured and molten flux F is superposed in the form of a layer on said molten aluminum alloy. Chemically, the flux F is required to contain ample amount of either or both chlorides and fluorides.

The following requirements must further be satisfied to ensure excellent removal of magnesium with low electric power consumption:

(1) The melting point of the flux should be lower than 700° C.

(2) The density of the flux should be considerably larger than that of molten magnesium and lower than that of molten aluminum.

(3) The electric conductivity of the flux should be high.

(4) The molten salts should not emit fume.

(5) The molten salts should be inexpensive.

Typical flux compositions which satisfy the requirements given above and which possess high practical value are shown below by way of example.

(a) 50% of NaCl+50% of KCl (b) 59% of MgCl$_2$+20% of KCl+20% of NaCl+1% of NaF (c) 18% of MgCl$_2$+17% of KCl+30% of NaCl+34% of CaCl$_2$+1% of NaF (d) 25% of MgCl$_2$+60% of NaCl+14% of CaCl$_2$+1% of NaF.

The flux compositions (b), (c) and (d) are practically equal to one another in demagging effect and the flux composition (c) excels particularly in terms of magnesium recovery. The flux composition (a) has substantially the same melting point as aluminum and proves to be economical. This particular flux composition, however, is limited in demagging effect because, when the MgCl$_2$ content in the flux increases to exceed 10 percent, the salt is electrolyzed to release Mg.

Hereinafter the process will be described as using a flux comprising a mixture of 50 percent of NaCl and 50 percent of KCl.

Figure 2:
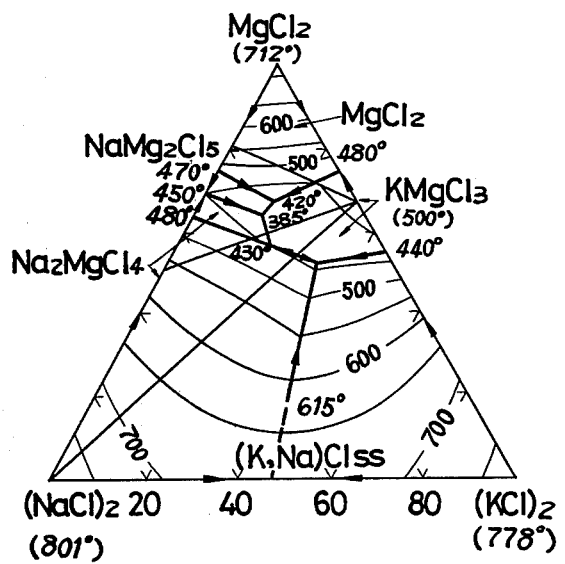
FIG. 2 is a three-component phase diagram of a NaCl-KCl-MgCl$_2$ system.

The container 1 is provided on the bottom and in the upper portion thereof with electrodes 2 and 3 respectively, which are connected by the medium of a variable resistor 4 to a DC power source 5. Denoted by 6 and 7 are an ammeter and a voltmeter respectively. The upper electrode 3 is adjusted so as to fall within the flux layer F. When an electric current is passed between the electrode 2 on the molten metal side as the anode and the electrode 3 on the flux side as the cathode, the NaCl present in the flux undergoes electrolysis to give rise to metallic sodium at the cathode 3 in consequence of Na+ e =Na. At the same time, at the anode 2, chlorine is generated by the reaction of 2Cl'−2 e =Cl$_2$. Since the anode 2 is held within the molten metal A, the chlorine thus generated at the anode preferentially combines with magnesium present in the molten metal A. There ensues a reaction of Mg+Cl$_2$=MgCl$_2$ and the reaction product MgCl$_2$ immediately floats up and is absorbed in the flux layer F. When the MgCl$_2$ is added to the molten flux layer comprising NaCl and KCl, it lowers the melting point of the flux as indicated in the phase diagram of FIG. 2 and is allowed to coexist with said salts in the layer.

Figure 3:
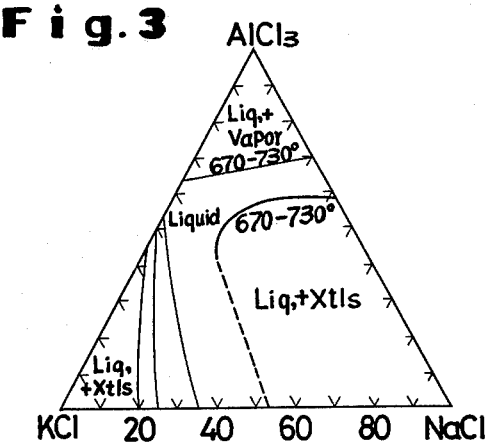
FIG. 3 is a three-component phase diagram of a NaCl-KCl-AlCl$_3$ system.

When the current density is large and also when the magnesium content in the molten metal is notably lowered, the chlorine liberated on the surface of the anode 2 gives rise not only to MgCl$_2$ but also to aluminum chloride in consequence of the reaction, $2Al + 3Cl_2 = 2AlCl_3$. This aluminum chloride is absorbed in the flux layer F (as is evident from FIG. 3) and is also consumed in the reaction, $2AlCl_3 + 3Mg = 3MgCl_2 + 2Al$, in the interface between the molten metal A and the flux layer F to promote the desired removal of magnesium. Thus, the process of this invention has absolutely no possibility of discharging harmful substances into the atmosphere.

As the electrolysis of the molten salts proceeds, the magnesium present in the molten metal A is transferred in the form of MgCl$_2$ into the molten flux layer F. The flux F which remains after completion of this demagging treatment can be used advantageously as the aluminum alloying flux such as in iron ladle furnaces and reverberatory furnaces for the purpose of improving melting yields of aluminum scraps. The demagging process of the present invention, therefore, is free from the production of waste as well as from the trouble of air pollution. It provides a perfect solution to the problem of air pollution.

Th main expense involved in practicing the present invention is limited to that of electric power. Generally in the fusion and electrolysis of sodium chloride, the potential required for the electrolysis is actually in the neighborhood of 5.7 to 6.0 volts, while it is theoretically 2.6 volts. In the case of this invention, since no chlorine is liberated at the anode but MgCl$_2$ is produced immediately, the potential for the electrolysis is low. The power consumption in this process, therefore, is small. The cost of electric power involved in the present invention is lower than that of chlorine gas involved in the conventional demagging method. The process of this invention, accordingly, is advantageous also from the economic point of view.

The present invention has been described in detail with respect to an operation using one specific type of flux and a DC power source. As described above, however, the principle of this invention resides in a novel process which comprises superposing a layer of molten flux containing chlorides or fluorides upon molten aluminum alloy and passing an electric current for electrolysis between the molten metal and the flux layer. The present invention, therefore, has been described for the purpose of illustrating said fundamental principle. Thus, combination of this fundamental principle with known art permits any person of ordinary skill in the art to derive a rich variety of embodiments of the invention. For example, control of temperature, control of electric current, selection of the shape of electrodes for enhancing the contact of chlorine or fluorine with the magnesium present in the molten metal, mechanism for relative movement of the electrode and the molten metal, automation of the operation, and system for continued operation of the treatment are readily conceivable ways for realizing such embodiments.

Figure 1:
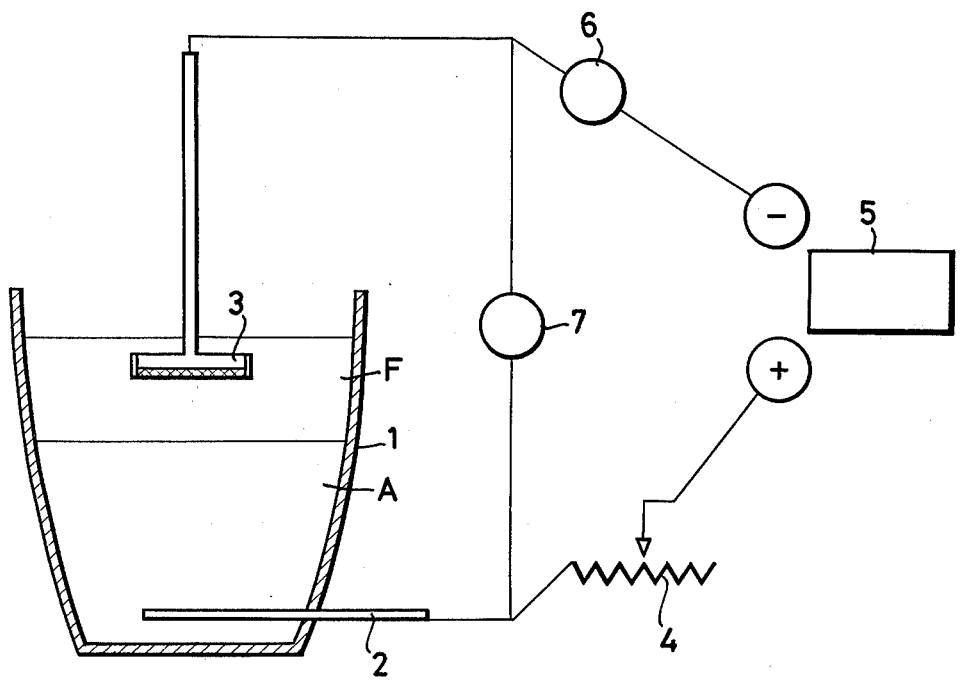
FIG. 1 is an explanatory diagram illustrating one preferred embodiment of this invention.

The system illustrated in FIG. 1 is indicated as using a DC power source. This power source may be replaced with an AC power source if a slight degradation in operational efficiency is of no concern. Where the electrolysis is effected by use of an AC power source, what particularly counts is the duration over which the electrode 2 in the molten metal A functions as the cathode. The reaction of $Mg + Cl_2 = MgCl_2$ which occurs when the electrode 2 functions as the anode will not be reversed when said electrode 2 functions as the cathode. This is because there are conditions which make the reversion of said reaction difficult, such as the fact that the MgCl$_2$ concentration in the flux layer F is low, that the theoretical electrolytic potential 2.3–2.5 volts of MgCl$_2$ is so close to the theoretical electrolytic potential 2.6 volts of NaCl as to permit liberation of metallic sodium and that the metallic sodium thus liberated does not easily form an alloy with aluminum alloy in the molten metal but is dispersed in the form of a metal fog within the flux layer. For this reason, not only a DC power source but also an AC power source or a combination AC-DC power source can be effectively used for the electrolysis in the process of this invention.

When sodium chloride is used as the principal component in the flux, metallic sodium is obtained at the cathode. By the same token, metallic magnesium or metallic calcium is obtained by using magnesium chloride or calcium chloride in the flux. It follows as a consequence that the demagging treatment of aluminum alloy can be carried out in combination with the electrolytic refining of such metals as mentioned above. To obtain metallic magnesium in this case, the MgCl$_2$ content in the flux must be at least beyond the level of 10 percent.

Motivated by the anxiety about the reality of the air pollution inevitably attendant upon the conventional method for demagging aluminum alloys, the present invention has succeeded in eliminating the danger of said air pollution by providing a new process which comprises completely covering molten aluminum alloy with a superposed layer of molten flux formed of safe compounds including chlorine or fluorine and effecting by electrolysis in the closed system the separation of chlorine or fluorine from said flux layer and the subsequent movement of separated chlorine or fluorine into the molten metal layer for thereby allowing the moved chlorine or fluorine to react with magnesium present within the molten metal. The reaction product floats up and becomes entrapped within the flux layer. The flux enriched with said reaction product is suitable for use in aluminum melting. Thus the process of this invention neither emits any harmful substance nor gives rise to any unusable waste.

This process also enjoys an economical advantage in the sense that the cost of the power it consumes is less than the cost of the chlorine gas used in the conventional method.

As a technique for the demagging treatment essential to the manufacture of aluminum alloys, particularly of casting aluminum alloys, the process of this invention may well be called epochal from the standpoint of improvement in the work environment and prevention of the air pollution.

Finally, the invention will be described with reference to specific working examples.

EXAMPLE 1:

(Container) A graphite crucible No. 6 provided with an automatic temperature control device, 100 mm in upper diameter, 150 mm in height, 760 cm$^3$ in inner volume and 60 mm in lower diameter.

(Electrode) A cathode made of an iron plate and disposed in the upper section of container and an anode made of graphite and disposed in the lower section of container.
(Molten aluminum)

|  | Fe(%) | Si(%) | Mg(%) | Al(%) | Ratio of Mg removal |
|---|---|---|---|---|---|
| Before treatment | 0.17 | 0.10 | 1.04 | balance |  |
| After treatment | 0.18 | 0.11 | 0.05 | balance | 95.2% |

(Molten Flux)

|  | NaCl(%) | KCl(%) | MgCl$_2$(%) |
|---|---|---|---|
| Before treatment | 50 | 50 | 0 |
| After treatment | 27.4 | 52.3 | 20.3 |

(Procedure) The crucible described above was kept at 720° C. and 1 kg of the molten aluminum was placed in it. A flux composed of 100 g each of sodium chloride and potassium chloride was superposed on the molten aluminum and melted thereon. Direct current electricity was passed between the two layers for three hours. At one hour intervals, the samples were collected and subjected to analysis.
(Electric current) DC 8.7 A, potential 4.4 to 4.8 V (average 4.6 V), current density 0.123 A/cm$^2$ anode and 0.69 A/cm$^2$ at cathode.

The following table shows the analysis of molten aluminum for magnesium content, the amount of magnesium removed, the current efficiency, the power consumption and the power consumption per kg of magnesium as determined of molten aluminum samples obtained at 0–3 hours of the electrolysis:

| Time of electrolysis (hr) | Mg content (%) | Amount of Mg removed (g) | Theoretical amount of Mg removed (g) | Current efficiency (%) | Power consumption (KWH) | Power consumption (KWH) per kg of Mg |
|---|---|---|---|---|---|---|
| 0 | 1.04 |  |  |  |  |  |
| 1 | 0.69 | 3.5 | 3.946 | 88.7 | 0.04 | 11.42 |
| 2 | 0.35 | 6.9 | 7.892 | 87.4 | 0.08 | 11.59 |
| 3 | 0.05 | 9.9 | 11.838 | 83.6 | 0.12 | 12.12 |

EXAMPLE 2:

(Container) Same as in Example 1.
(Electrode) Same as in Example 1.
(Molten aluminum)

|  | Fe(%) | Si(%) | Mg(%) | Al(%) | Ratio of Mg removal (%) |
|---|---|---|---|---|---|
| Before treatment | 0.19 | 0.09 | 1.19 | balance |  |
| After treatment | 0.20 | 0.10 | 0.03 | balance | 97.5 |

(Molten flux) 18% of MgCl$_2$, 17% of KCl, 30% of NaCl, 34% of CaCl$_2$ and 1% of NaF
(Procedure) The procedure of Example 1 was repeated, except 500 g of the flux described above was used.
(Electric current) DC 8.7A, 1.5 to 1.8V of potential (average 1.65V)

| Time of electrolysis (hr) | Mg content (%) | Amount of Mg removed (g) | Theoretical amount of Mg removed (g) | Current efficiency (%) | Power consumption (KWH) | Power consumption (KWH) per kg of Mg |
|---|---|---|---|---|---|---|
| 0 | 1.19 |  |  |  |  |  |
| 1 | 0.80 | 3.9 | 3.946 | 98.8 | 0.0144 | 3.69 |
| 2 | 0.41 | 7.8 | 7.892 | 98.8 | 0.0287 | 3.68 |
| 3 | 0.03 | 11.6 | 11.838 | 98.0 | 0.0431 | 3.72 |

(Magnesium recovered) After three hours of electrolysis, the molten magnesium which had floated up to the surface of the flux layer was scooped out and was found to weigh 9.8 g, indicating the current efficiency for magnesium recovery to be 82.8%, and the power consumption to be 4.40 KWH per kg of magnesium.

In each of the examples described above, none of the pungent odors of chlorine, fluorine, aluminum chloride or aluminum fluoride was sensed during the electrolysis, indicating that the treatment discharged absolutely no harmful gas.

What is claimed is:

1. A process for removing magnesium from aluminum or an aluminum alloy without causing air pollution, which comprises
   (a) pouring a melt of aluminum or an aluminum alloy containing magnesium into a vessel,
   (b) superposing a layer of molten flux on the melt, the molten flux layer consisting of a mixture of 59% by weight of MgCl$_2$, 20% by weight of KCl, 20% by weight of NaCl and 1% by weight of NaF, or a mixture of 18% by weight of MgCl$_2$, 17% by weight of KCl, 30% by weight of NaCl, 34% by weight of CaCl$_2$ and 1% by weight of NaF, or a mixture of 25% by weight of MgCl$_2$, 60% by weight of NaCl, 14% by weight of CaCl$_2$ and 1% by weight of NaF,
   (c) disposing a respective electrode in the melt and the molten flux layer,
   (d) passing an electric current between the electrodes until the molten magnesium floats up to the surface of the flux layer, and
   (e) removing the magnesium from the flux layer.

2. A process for removing magnesium from aluminum or an aluminum alloy without causing air pollution, which comprises
   (a) pouring a melt of aluminum or an aluminum alloy containing magnesium into a vessel,
   (b) superposing a layer of molten flux on the melt, the molten flux layer consisting of a mixture of 50% by weight of NaCl and 50% by weight of KCl,
   (c) disposing a respective electrode in the melt and the molten flux layer, and
   (d) passing an electric current between the electrodes until chlorine is generated in the molten flux layer, the generated chlorine reacts with the magnesium in the melt to produce magnesium chloride and the reaction product immediately passes from the melt into the molten flux layer.

* * * * *